(12) United States Patent
Tani et al.

(10) Patent No.: US 7,020,081 B1
(45) Date of Patent: Mar. 28, 2006

(54) STREAM DISTRIBUTION SYSTEM

(75) Inventors: Hideaki Tani, Tokyo (JP); Koji Taniguchi, Kawasaki (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/209,900

(22) Filed: Dec. 11, 1998

(30) Foreign Application Priority Data

Jul. 10, 1998 (JP) .................................. 10-195726

(51) Int. Cl.
*G01R 31/08* (2006.01)
(52) U.S. Cl. ....................... 370/230; 370/401; 370/468
(58) Field of Classification Search ................ 370/400, 370/401, 420, 431, 433, 463, 464, 465, 468; 348/21, 14.01; 725/78, 82, 83, 92, 94, 88
See application file for complete search history.

(56) References Cited

U.S. PATENT DOCUMENTS

| | | | | | |
|---|---|---|---|---|---|
| 4,884,286 | A | * | 11/1989 | Szdzepanek et al. ........ | 375/372 |
| 5,115,429 | A | * | 5/1992 | Hluchyj et al. ............. | 370/231 |
| 5,361,091 | A | * | 11/1994 | Hoarty et al. ............... | 359/125 |
| 5,388,089 | A | | 2/1995 | Odaka et al. | |
| 5,442,389 | A | * | 8/1995 | Blahut et al. ................. | 725/92 |
| 5,485,370 | A | | 1/1996 | Moss et al. | |
| 5,555,441 | A | * | 9/1996 | Haddad ....................... | 725/93 |
| 5,559,549 | A | | 9/1996 | Hendricks et al. | |
| 5,610,910 | A | * | 3/1997 | Focsaneanu et al. ........ | 370/351 |
| 5,612,955 | A | * | 3/1997 | Fernandes et al. .......... | 370/433 |
| 5,625,864 | A | * | 4/1997 | Budow et al. ................. | 725/82 |
| 5,734,677 | A | * | 3/1998 | Liew et al. .................. | 375/240 |
| 5,782,642 | A | * | 7/1998 | Goren ..................... | 369/47.14 |
| 5,802,448 | A | * | 9/1998 | Brown et al. ................. | 725/96 |
| 5,940,387 | A | * | 8/1999 | Humpleman ................ | 370/352 |
| 5,982,813 | A | * | 11/1999 | Dutta et al. ................. | 370/232 |
| 6,014,693 | A | * | 1/2000 | Ito et al. ...................... | 709/219 |
| 6,014,694 | A | * | 1/2000 | Aharoni et al. ............. | 709/219 |
| 6,031,845 | A | * | 2/2000 | Walding ...................... | 370/335 |

(Continued)

FOREIGN PATENT DOCUMENTS

JP       B-7-249      3/1997

(Continued)

OTHER PUBLICATIONS

Office Action, Japanese Patent Application No. 195726/98, English translation included.

*Primary Examiner*—Huy D. Vu
*Assistant Examiner*—Daniel Ryman
(74) *Attorney, Agent, or Firm*—Christensen O'Connor Johnson Kindness PLLC

(57) ABSTRACT

A stream distribution system comprises a stream distribution server, a plurality of terminal devices each having a information reproduction function, and a local area network for connecting both of the stream distribution server and the terminal devices, in which the stream distribution server comprises reception means for receiving a stream data of a digital form transmitted through a broadcasting network or a communication network, selection means for selecting a predetermined unit of information from the stream data received by the reception means based on a distribution condition set by the terminal device which has an information reproduction function, file I/O means for controlling a file device under management of the stream distribution server and for outputting information selected by the selection means to the file device, and transmission means for transmitting information selected by the selection means to the terminal device after executing a predetermined processing according to a limitation of a preset data transmission band.

8 Claims, 6 Drawing Sheets

U.S. PATENT DOCUMENTS

| | | | | |
|---|---|---|---|---|
| 6,108,516 A | * | 8/2000 | Kuether | 725/61 |
| 6,167,084 A | * | 12/2000 | Wang et al. | 375/240.02 |
| 6,212,206 B1 | * | 4/2001 | Ketcham | 370/516 |
| 6,233,389 B1 | * | 5/2001 | Barton et al. | 386/46 |
| 6,272,085 B1 | * | 8/2001 | Maeda | 369/47.14 |
| 6,307,839 B1 | * | 10/2001 | Gerszberg et al. | 370/235 |

FOREIGN PATENT DOCUMENTS

| | | |
|---|---|---|
| JP | 9-233086 | 9/1997 |
| JP | 10-164533 | 6/1998 |

* cited by examiner

STREAM DISTRIBUTION SYSTEM

BACKGROUND OF THE INVENTION

The present invention relates to an information delivery system for delivering digital information transmitted through a broadcasting network or a communication network to a plurality of terminal devices, especially, to a stream distribution system which handles stream data.

In recent years, due to the spread of the digital broadcasting network and the communication network (including a computer network) which includes digital satellite broadcasting and CATV, etc., a so-called information delivery system is proposed to provide various information, that is, multimedia information to many and unspecified homes (hereafter, called a user). Here, multimedia information means digital information on the video, the static image, and the voice, etc. In this digital information, information, which especially includes a video, a voice, a static image, and character information, etc., and requires a real time characteristic, is called stream data. This stream data is handled in distinction from digital information composed only of a static image and character information.

To achieve such an information delivery system, a local area server which is called a set-top box (STB) and/or an IRD (Integrated Receiver Decoder) is proposed. The personal computer connected with a television set and a communication network is handled as a terminal device for the local area server.

A preferable construction is as follows as the information delivery system. That is, it is desirable that the information delivery system is constructed as being arranged in each home, being connected with a plurality of terminal devices such as television sets and personal computers, and receives plural kinds of stream data transmitted through the digital broadcasting network and the communication network and sends it to each terminal device. Plural kinds of stream data includes video stream (VS) from video on demand (VOD) system which uses the communication network etc. besides said digital broadcasting stream (BS).

In such a system, the user arbitrarily selects information (program and title, etc.) which he/she wants to attend from among broadcasting stream (BS) and video stream (VS) to be able to reproduce the information on the display of the terminal device.

As mentioned above, the user selects desired information on the demand from various stream data by the information delivery system to be able to attend the information. By the way, the content of the transmitted program has changed hourly especially in the broadcasting stream. Therefore, there is a possibility to overlook a program with a high demand started in another channel (for example CATV), when, for example, an attention of the stream of the channel (for example satellite broadcasting) which the user selected is done. In this specification, a term "attention (attend)" means that the stream data is received, decoded, and reproduced at the terminal device.

There is a possibility that a similar state is generated in case the user first attends the stream of VOD. To prevent such a state, the stream not selected by the user is monitored as a background, and when the attention priority of the user changes, a method of switching the stream of the selected attention and the background stream is proposed. Here, the data transmission band (sending band to the terminal device) is usually limited in the system like the local area network which includes said local area server. This data transmission band (or, only called "band") means an amount of the transmission data per unit time (bps: bits per second).

Since there is a band limitation like the above-mentioned, it is necessary to prepare the distribution option having a narrow band for each channel of the broadcasting stream (Or, channel of the VOD stream). Then, by using this distribution option having a narrow band, the method of simultaneously displaying channels on a display of the terminal device by mixing the stream of each channel is proposed.

However, the picture quality at attending the stream relatively becomes low when the band is narrow. To attend the stream which the user demands by the high picture quality, it is necessary to reset the band of the corresponding stream, but the operation procedure is complex. It is not actually easy even though it is preferable to be able to change the band distribution of each channel continuously and arbitrarily.

BRIEF SUMMARY OF THE INVENTION

An object of the present invention is to provide a stream distribution system which receives the plural kinds of stream data, selects the information with high priority of request of user, and can distribute the information to the terminal devices by appropriate band within the range of limited data transmission band.

The present invention is an information delivery system which has reception means for receiving the stream data on plural kinds of digital form transmitted through the broadcasting network or the communication network, selection means for selecting the fixed units of information from the stream data received by the reception means according to the request from a terminal device, and sending means for sending the selected information by the selection means to a predetermined terminal device.

Specifically, the reception means simultaneously receives plural kinds of stream data of the packet unit. The selection means selects (extracts) information of the packet unit according to the instruction from the terminal device. The sending means performs a filtering processing for adjusting the transmission band of the stream data within the range of the limited transmission band to send to the terminal device.

With such a system configuration, the user comes to be able to attend stream data on the program with high attention priority selectively from among broadcasting stream data and stream data from the VOD system. In this case, the transmission band of selected stream data is adjusted within the range of the limitation of the transmission band allocated to the terminal device. Therefore, even when there is no room in the transmission band for the terminal device, the transmission band of selected stream data is adjusted automatically, and selected stream data is transmitted to the terminal device. The user does not operate the band setting of stream data when there is room in the transmission band for the terminal device, and the stream data with the high picture quality can be transmitted to the terminal device automatically for example.

As another viewpoint of the present invention, the system has the file device, and the function to store information not selected by the user in received stream data into the file device (Corresponds to the image recording processing) is achieved. As a result, continuously attending the stream data on the program which receives to the period simultaneously and is recorded after the attention of the stream data on the program with high attention priority becomes possible.

According to the present invention, in the information delivery system which can receive the plural kinds of digital stream data, and distribute by selecting information with high priority of the request of the user, the selected information can be distributed to the terminal device by an appropriate sending band by changing the band distribution within the range of the transmission band to which the system is limited according to the state. If such a present invention is applied to the system which can attend stream data on plural programs etc. from especially plural channels at the same time, the user can attend information on the demand from various stream data in real time, and continuous and appropriate band distribution without requiring a complex procedure by which the band distribution of each channel is operated can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
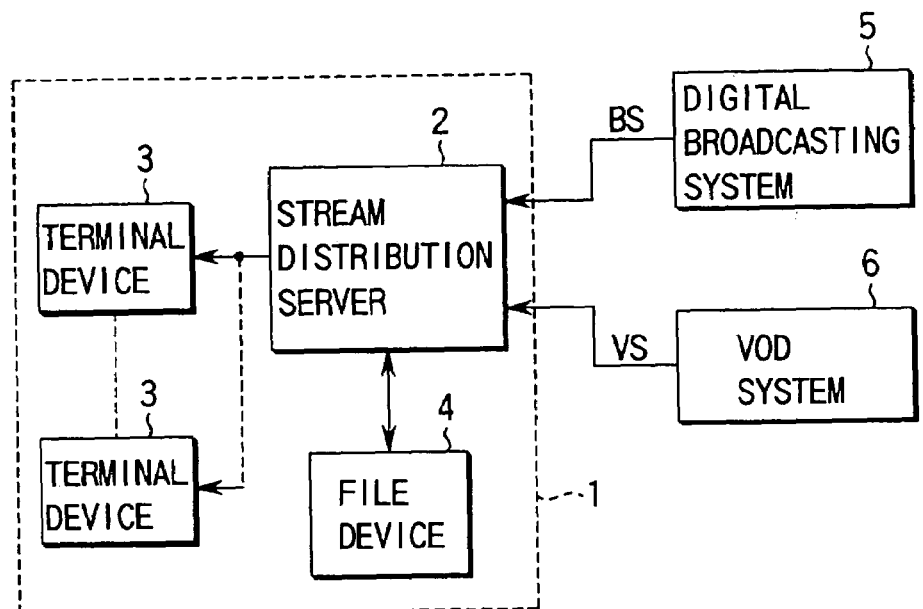
FIG. 1 is a block diagram which shows a basic construction of the embodiment of the present invention of the information delivery system.

Hereafter, an embodiment of the present invention will be explained referring to the drawing.

Figure 2:
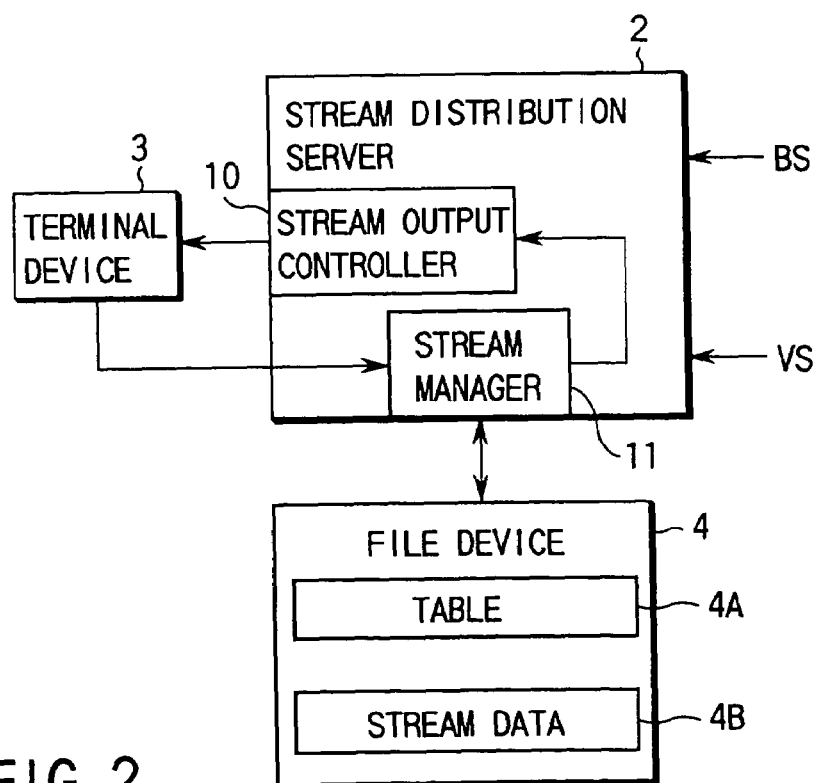
FIG. 2 is a block diagram to explain the construction of the local area network system in FIG. 1.
Figure 3:
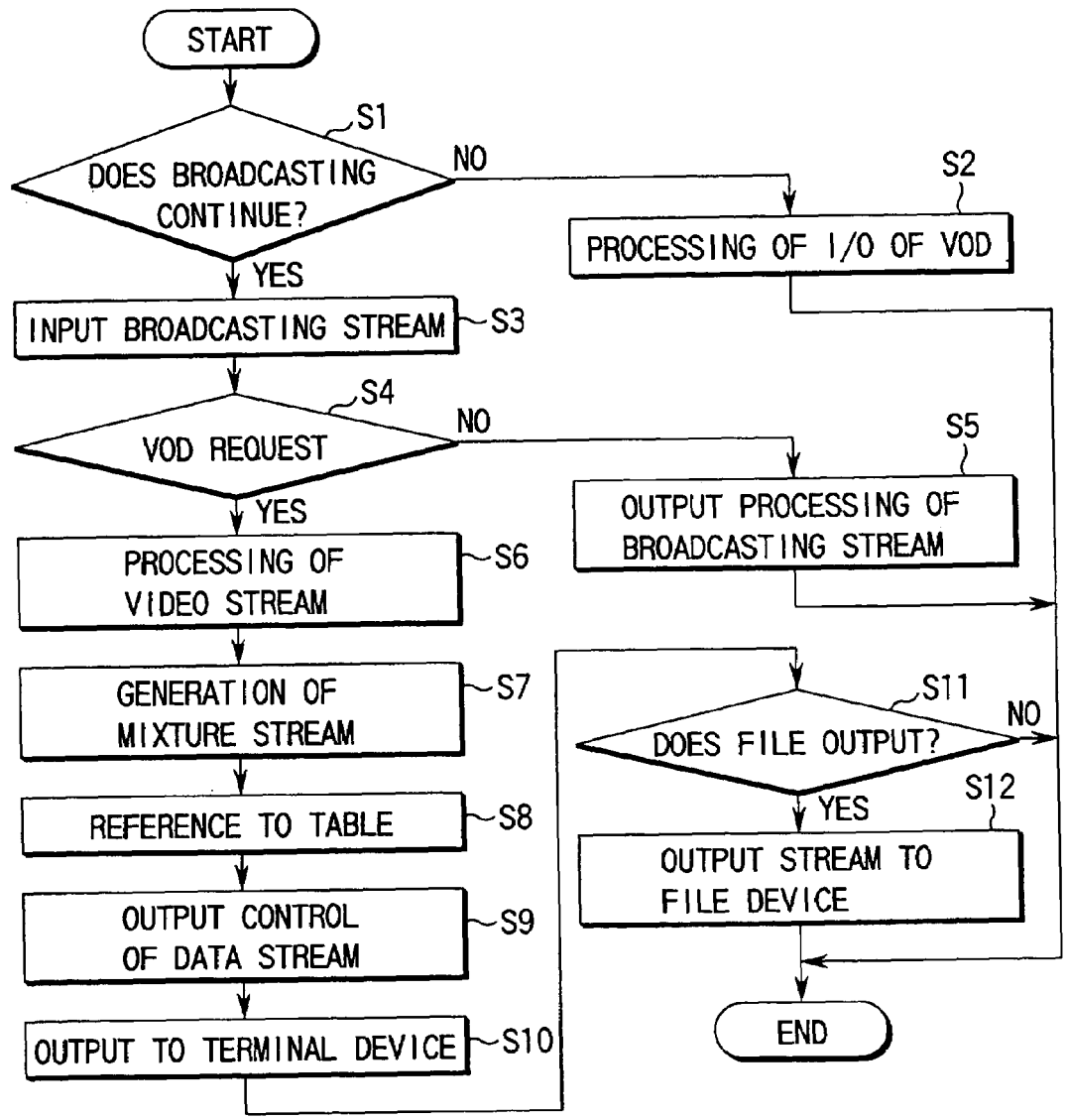
FIG. 3 is a flowchart to explain the operation of this system.

FIG. 1 is a block diagram which shows a basic construction of the system relating to this embodiment. FIG. 2 is a block diagram to explain the construction in the local area network of this system. FIG. 3 is a flowchart to explain the operation of this system.

(Construction of Information Delivery System)

The information delivery system of this embodiment is constructed with a local area network 1 installed in an ordinary home and the network to which a stream data is supplied as shown in FIG. 1. The local area network 1 is a limitation range network which corresponds to conventional LAN against an external network (wide area network). The network on the supply side assumes a digital broadcasting system 5 and a VOD (video on demand) system 6. The digital broadcasting system 5 is a digital satellite broadcasting office and a CATV (cabled television) broadcasting station, etc. Various programs, which are digital stream data BS, are broadcast. The VOD system 6 transmits the video information in the movie etc. which are digital stream data VS according to the request from the user.

The local area network 1 roughly consists of a stream distribution server 2, a plurality of terminal devices 3, and a file device 4. The terminal device 3 is a display for the user to attend stream data and is a television set or a personal computer. The terminal device 3 of this embodiment assumes not only mere reception function of the stream data but also the device having the function to transmit various requests and the instructions to the stream distribution server 2 and the external network. Here, the external network means the communication network where the VOD system 6 is connected.

The stream distribution server 2 is a main component of the local area network 1, and has a function to connect with the outside broadcasting networks and the communication network, and to distribute the transmitted stream data to each terminal device 3 based on a fixed distribution condition (Described later). A specific construction of stream distribution server 2 is described later referring to FIG. 4.

The file device 4 is a storage device with a large capacitance used for storing (recording) received stream data and holding setting information (table information described later) to set the distribution condition. Specific, it is a hard disk drive and is an optical disk drive.

(Operation of the System)

In addition, especially, a specific function of the local area network 1 and the stream distribution operation referring to FIG. 2 and FIG. 3 will be explained.

The stream distribution server 2 has the plurality of reception means to connect with each of the broadcasting network and the communication network, and can receive plural kinds of the stream data in the lump at the same time. The stream distribution server 2 mixes received stream data, selects partial stream data (according to the packet unit described later) based on a fixed distribution condition (request from terminal device 3). To achieve such a function, the stream distribution server 2 has each element of a stream output control section 10 and a stream manager 11 as shown in FIG. 2.

Hereafter, the stream distribution operation is explained as a main of the operation of stream distribution server 2 referring to the flowchart of FIG. 3.

First, the user operates the input device of terminal device 3, and requests one of or both of the reception of the broadcasting stream BS from the broadcasting network and the distribution of the video stream VS from the VOD system 6 through the communication network. The stream distribution server 2 executes processing necessary for distributing each stream at the distribution request of either of them (steps S1 to S5).

In this embodiment, a case where each of stream data BS and VS is received from each network is assumed. That is, the stream distribution server 2 executes a processing of inputting the broadcasting stream data BS from the broadcasting system 5 and the video stream data VS from the VOD system 6, and generating mixture stream data (steps S1, S3, S4, S6, and S7).

The stream distribution server 2 selects an information decided from mixed stream data based on a fixed distribution condition (attention request), that is, an information with high priority. A unit information on the selection corresponds to a sub-stream data on the packet unit specifically. The stream manager 11 selects the sub-stream data referring to table information 4A according to priority, and sends the sub-stream data from the stream output control section 10 to the terminal device 3 (steps S8 to S10). The table information 4A corresponds to a destination managing table having packet identification information (packet identifier) which identifies each packet constructing a stream data as described later (see FIG. 5). The table information 4A may be memorized to an internal memory of the stream distribution server 2.

The stream output control section 10 has a filter which adjusts the data transmission band of output stream data, and outputs selected stream data to the terminal device 3 by a fixed band (means an amount of data per the unit time as mentioned above). Here, the data transmission band (amount of the sending data to the terminal device 3) is limited in the local area network 1. Therefore, the stream output control section 10 adjusts the total band within the predetermined range of the band limitation value by the filter when outputting the stream data in high order of priority.

In addition, the stream manager 11 has the function to store the received stream data in the file device 4. Specifically, an information on relatively low priority is stored in the file device 4 for an information on the relatively high priority selected from the mixed stream data (steps S11 and S12). The stream manager 11 stores (records) an information specified in the received stream data into the file device 4 according to the instruction from the terminal device 3.

(Construction and Operation of Stream Distribution Server)

Figure 4:
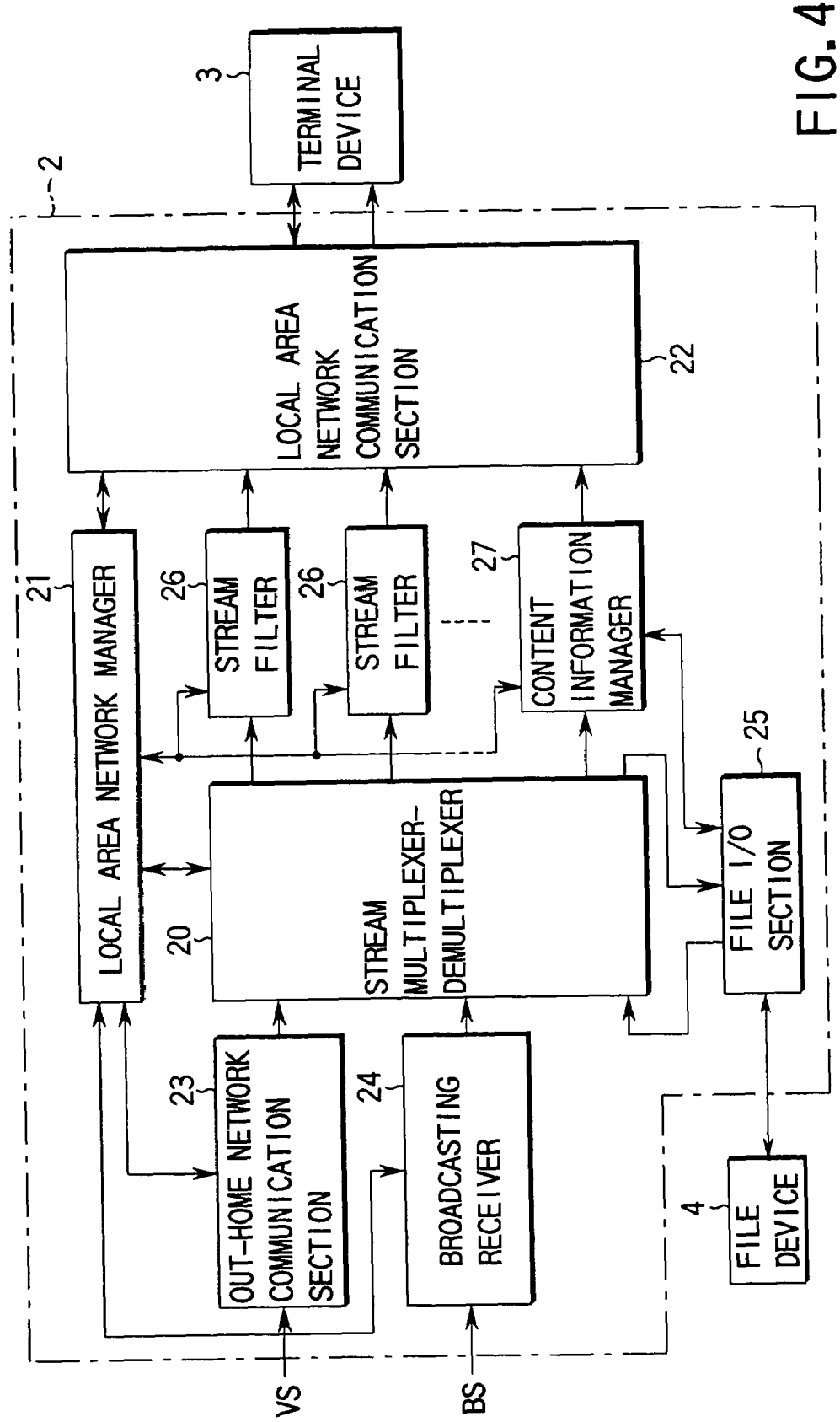
FIG. 4 is a block diagram which shows a construction of the stream distribution server of this system specifically.

FIG. 4 is a block diagram which shows a specific construction of the stream distribution server 2 according to this embodiment.

The stream distribution server 2 has a stream multiplexer-demultiplexer 20, a local area network manager 21, a local area network communication section 22, a wide area network communication section 23, a broadcasting receiver 24, a file I/O section 25, a stream filter 26, and a content information manager 27.

The wide area network communication section 23 is connected with an outside communication network, and receives the video stream data VS from the VOD system 6 in this embodiment. The broadcasting receiver 24 is connected with the broadcasting network, and receives the broadcasting stream data BS from the broadcasting system 5 in this embodiment. The local area network communication section 22 is connected with terminal device 3, and inputs the output of the stream data and the command from the terminal device 3.

The stream multiplexer-demultiplexer 20 receives the video stream data VS from the wide area network communication section 23 and the broadcasting stream data BS from the broadcasting receiver 24 in the lump and joins (mixes) them. In addition, the stream multiplexer-demultiplexer 20 extracts a packet data, which corresponds to the attention request from each terminal device 3, from the stream data to redistribute it to each terminal device 3 again. The local area network manager 21 monitors the use state of the local area network, and allocates the band to each terminal device 3 within the predetermined range of the limitation value. Therefore, the band allocated in each terminal device 3 will change according to the use state of the local area network.

Each terminal device 3 has a stream filter 26. The stream filter 26 controls the band when the stream data on the packet unit selected by the stream multiplexer-demultiplexer 20 is transmitted to each terminal device 3. That is, the stream filter 26 adjusts the transfer rate of the output stream to the terminal device 3 to become within the range of the band allocated by the local area network manager 21. Specifically, the stream filter 26 has a transfer rate adjustment (filtering processing) function called as, for example, Stream Shaping method, and adjusts the band to become within the range of the allocated band referring to the priority table described later (reduction in the amount of data). Here, the Stream Shaping is a method of filtering the packet which adjusts the amount of the transmission data while maintaining the quality of the stream as much as possible based on the packet priority for the stream made a packet.

The local area network manager 21 not only manages a transmission of the stream data from an external network but also comprises a function to perform a local area communication (extension telephone etc.), a wide area communication such as an internet, a facsimiles, and telephone, and a control and monitoring of home electric appliances product which exists in the home, etc.

The contents information manager 27 manages the program information and the data information multiplexed in the broadcasting stream data, and information on the stream data stored in the file device 4 in the lump as content information. The content information includes a file name, a content title, a reproduction time, a bit rate, quality information for adjusting the transmission band, a parameter necessary for the reproduction, information on the packet identifier and a packet priority, a broadcasting starting time, a broadcasting end time, and additional information added by the user, etc. The stream multiplexer-demultiplexer 20 selects and extracts program information from the stream data received from the broadcasting network through the broadcasting reception section 24, and outputs this information to the content management information 27. When the content information providing request is accepted from the terminal device 3, the local area network manager 21 acquires content information from the content information manager 27, and transmits this to the terminal device 3. When the attention request, the recording request or the reservation recording request is accepted from the terminal device 3, the content information is acquired from the content information manager 27, and the stream data transmission processing, the recording processing, and the reservation recording processing are executed referring to this content information.

(Construction of Stream Multiplexer-Demultiplexer 20)

Figure 5:
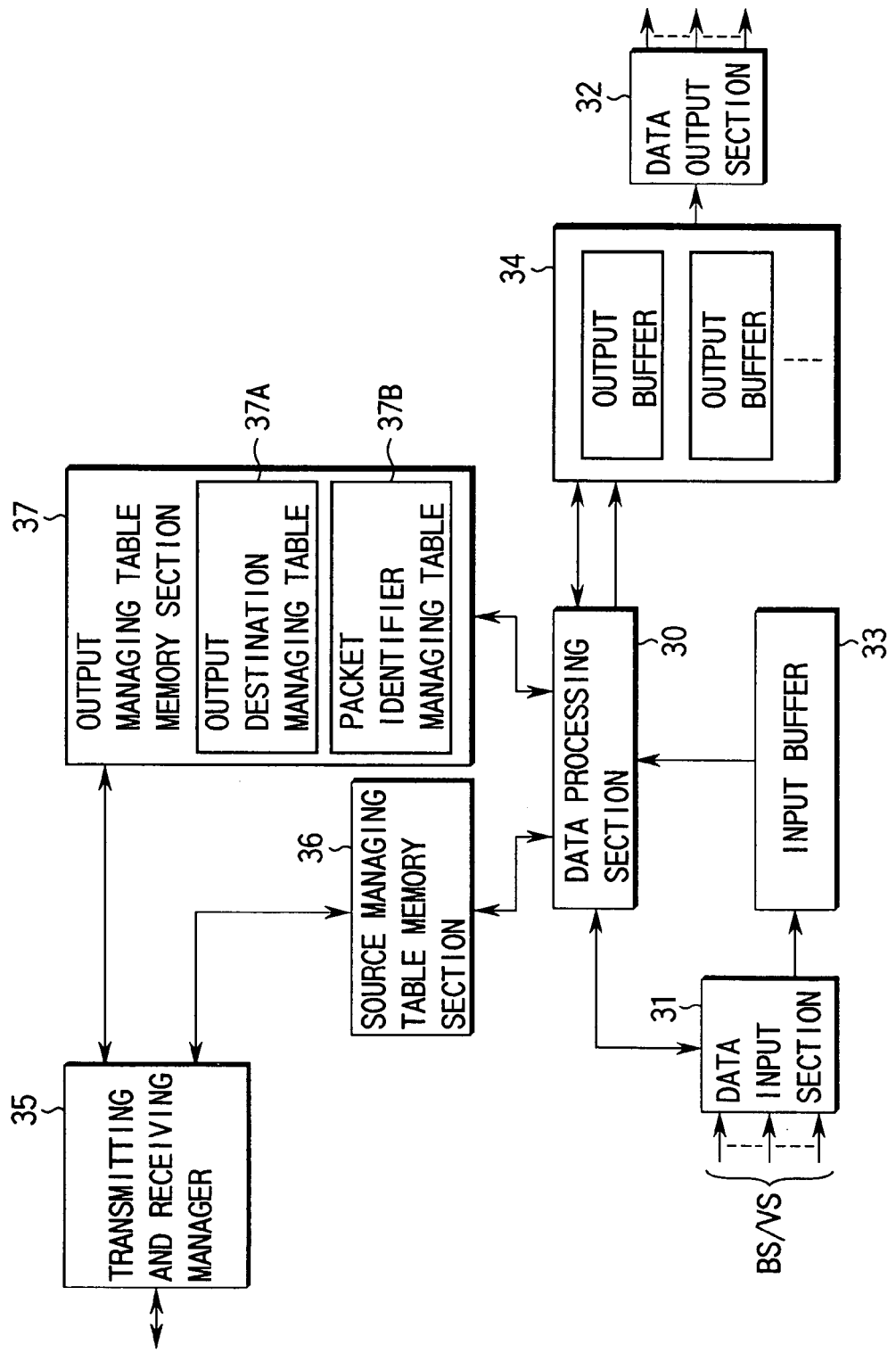
FIG. 5 is a block diagram which shows a specific construction of the stream multiplexer-demultiplexer included in this stream distribution server.

FIG. 5 is a block diagram which shows a specific construction of the stream multiplexer-demultiplexer 20 installed in the above-mentioned stream distribution server 2.

The stream multiplexer-demultiplexer 20 has a data processing section 30, a data input section 31, a data output section 32, an input buffer section 33, an output buffer section 34, a transmitting and receiving manager 35, a source managing table memory section 36, and a destination managing table memory section 37.

The data processing section 30 is a main element of stream multiplexer-demultiplexer 20, and executes the distribution processing of the stream data (sending processing) according to the above-mentioned distribution condition. Specifically, the data processing section 30 consists of the memory which stores a program necessary for the microprocessor (CPU) and the operation.

The data input section 31 is connected with the above-mentioned wide area network communication section 23 and the broadcasting receiver 24, and inputs the video stream data VS and the broadcasting stream data BS to store into the input buffer section 33. The data input section 31 also inputs the file information (VS/BS) from the file I/O section 25. The output buffer section 34 holds the stream data selected (branched) by the data processing section 30 in the packet unit. The data output section 32 extracts the information of the packet unit held in the output buffer section 34 one by one, and outputs it to the above-mentioned stream filter 26 and the content information manager 27. The transmitting and receiving manager 35 is connected with the above-mentioned local area network manager 21, and transmits and receives various settings (registration) information necessary for distribution processing of information of the packet unit.

The data processing section 30 and the transmitting and receiving manager 35 manage the source managing table memory section 36 and the destination managing table memory section 37, and registers various setting information. That is, the data processing section 30 registers an information which shows a source of the stream data in the source managing table memory section 36 as a various setting information. The data processing section 30 registers an information which shows a destination of the stream data to the output destination managing table 37A of the destination managing table memory section 37. In addition, the data processing section 30 registers the packet identifier (packet identification information) of the stream data on each every output destination in the packet identifier managing table 37B of the destination managing table memory section 37. The transmitting and receiving manager 35 can also perform the above register processing.

When a certain program A has been constructed with a video Va1, an audio Aa1, an audio Aa2, and a character information Ca1, and there is an attention request from a certain terminal device 3 about the video Va1 and the audio Aa2 of the program A, an information corresponding to the content of the attention request is registered in the destination managing table memory section 37. When the content of the attention request from the terminal device 3 (program and the component) is changed, the destination managing table memory section 37 is renewed according to it. When a pause request is performed from the terminal device 3, a flag, which shows the pause, is set to the destination managing table memory section 37. As a result, data processing section 30 pauses the output of information on each every output destination.

It becomes possible to perform the setting to distribute a plurality of programs to a certain terminal device 3 by using the destination managing table memory section 37. In addition, a validity/invalidity of the information sending is set in the destination managing table memory section 37 on every output destination. The setting or the registration of these setting information can be dynamically changed in the transmitting and receiving processing of the stream data.

(Specific Operation of the Stream Distribution Server)

Figure 6:
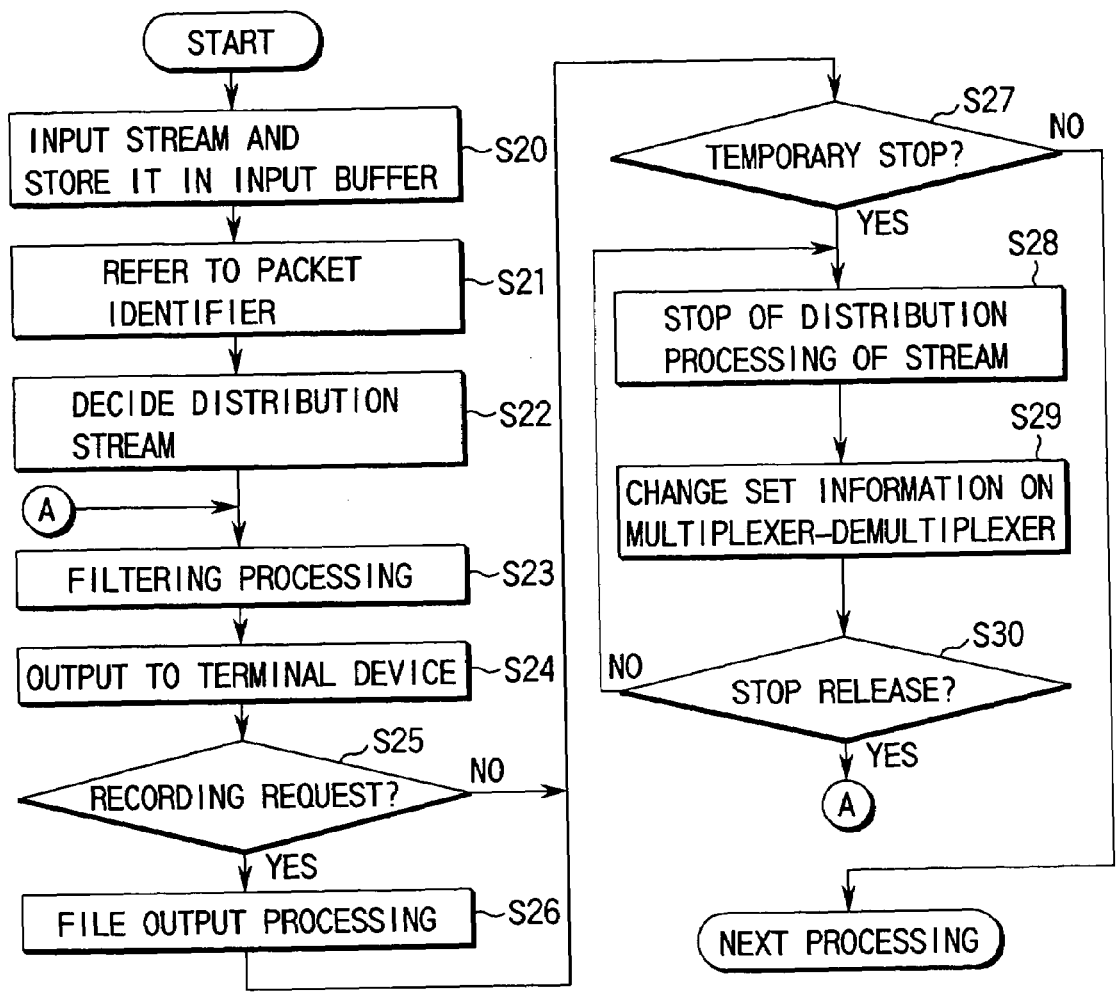
FIG. 6 is a flowchart to explain a specific operation of the stream distribution server.
Figures 7, 8:
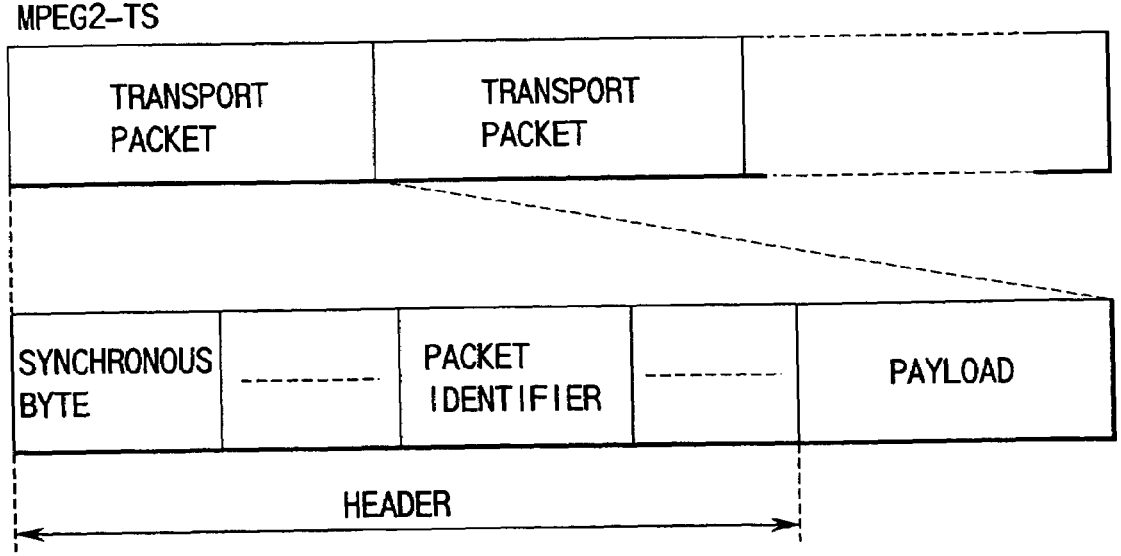
FIG. 7 is a conceptual rendering showing a concrete example of the priority table information on this stream distribution server.
FIG. 8 is a conceptual rendering showing the concrete example of stream data in this system.

A specific operation of the system of this embodiment will be explained referring to a flowchart of FIG. 6, and FIG. 7 and FIG. 8 in addition to FIG. 4 and FIG. 5 based on a specific construction of the above-mentioned stream distribution server.

Here, the stream distribution server 2 expediently assumes the case which receives the broadcasting stream BS, selects the program stream requested by the user, and distributes it to the terminal device 3. The digital broadcasting stream BS is a multiplex stream to which a plurality of programs are multiplexed. The multiplex stream, which consists of, for example, MPEG (Moving Picture Coding Group) 2-TS (Transport Stream) as shown in FIG. 8 as a concrete example, is assumed. This embodiment shows a multiplex stream by which the packet identifier (identification information which corresponds to PID) is added to the header section of each packet which constructs the stream.

The data processing section 30 of the stream multiplexer-demultiplexer 20 selects a specific program stream referring to the packet identifier of the broadcasting stream BS stored in the input buffer 33 (steps S20 to S22). That is, the data processing section 30 registers the packet identifier according to the attention request program from the terminal device 3 in the packet identifier managing table 37B.

Here, a method of acquiring program information (guide information of contents which are to be attended in the terminal device 3 will be explained). The stream distribution server 2 regularly extracts the program information multiplexed in the received broadcasting stream BS, and stores it into the file device 4. Here, an EPG (Electronic Program Guide) information is assumed as a concrete example of the program information. And, the stream distribution server 2 transmits the stored EPG information to the terminal device 3 according to the request from the terminal device 3. In this case, the stream distribution server 2 may create the menu which combines program schedules with GUI for the control by processing EPG information, and present on the display of the terminal device 3.

The terminal device 3 comprises the screen synthesis means for achieving superimpose and a multiscreen to attend a plurality of programs. The terminal device 3 can request the attention of plural programs by these means. However, the terminal device 3 basically receives one program of the SD (Standard Definition) level (standard picture quality) and can receive plural programs only when there is room in the band in the local area network. The program at the HD (High Definition) level with the higher picture quality than the SD level can be received when there is room in the band in the local area network.

Next, the stream distribution server 2 executes a processing in which the stream data of the packet unit selected by the stream multiplexer-demultiplexer 20 is output to the terminal device 3 (step S24). Here, the local area network manager 21 of the stream distribution server 2 classifies and monitors the transmission of the stream data on the local area network and other communications (a telephone, an internet connection, and a FAX, etc.) according to the types of the information and users. That is, the local area network manager 21 keeps the band for which the local area network can be used at the present time within the predetermined range of the limitation band.

The stream distribution server 2 sends the selected stream data to the terminal device 3 through the stream filter 26. Here, the stream data is distributed according to the specification (picture quality) of the attention request from the terminal device 3 in a case that there is room in the band for which the local area network can be used by monitoring the local area network manager 21. That is, the stream filter 26 outputs stream data to the terminal device 3 by the band (amount of data) which coincides with the specification of the HD level, if there is room in the band, for example, when the stream data at the HD level is requested.

On the other hand, the stream filter 26 adjusts the transmission band of the stream data within the range of the allocated band to the terminal device 3 as mentioned above when there is no room in the band for which the local area network can be used (that is, the amount of the stream of the transmission data is reduced). That is, by the filtering processing of the stream filter 26, the stream data within the range of the limitation band is passed, and is transmitted to the terminal device 3 (step S23). Therefore, when the attention request from the terminal device 3 is the stream data of, for example, a high band, like the HD level, the amount of data distributed by the filtering processing is reduced. Specifically, the distributing number of programs will be reduced or the information qualities of one program will be reduced. Here, the information quality means, for example, the number of frames of the display per second, the space resolutions, the distribution program numbers, and contents etc. of voice information (presence of the multi national language voice etc.).

As mentioned above, the stream distribution server 2 of this embodiment dynamically changes the transmission band which can be used by the filtering processing within the range of the limitation band in the local area network. Specifically, first, the stream distribution server 2 executes the distribution of the stream data according to the attention request for example for the terminal device 3. At this time, the stream distribution server 2 reduces the allocated band to the terminal device 3 by the filtering processing of the stream filter 26 as described above if the room of the band in the local area network is reduced. Therefore, the attention can be continued in the terminal device 3 even though the quality of the stream data transmitted to the terminal device 3 is deteriorated. Naturally, the quality of the stream data returns to the original ones if the room of the band in the local area network is restored.

Here, the stream filter 26 corresponding to each terminal device 3 is provided inside the stream distribution server 2. For example, the stream filter 26 executes a filtering processing of having (creating) the priority table (consists of the packet identifier and the priority data) shown in FIG. 7, and adjusts (reduces) the amount of the transmission data referring to this priority table to become within the allocated band. For example, a Stream Shaping method is used as such filtering processing.

The terminal device 3 notifies the stream distribution server 2 the recording request to record the program stream data on attending (YES in step S25). The stream distribution server 23 generates the stream branch from the stream multiplexer-demultiplexer 20, and executes the file output processing (step S26). That is, the local area network manager 21, which receives the recording request, controls the multiplexer-demultiplexer 20, and the file I/O section 25, and stores the stream data to be recorded in the file device 4 as shown in FIG. 4. When the stream distribution server 2 receives the recording reservation request from the terminal device 3, the recording reservation setting is performed to the content information manager 27. A recording starting matter is notified from the content manager 27 to the local area network manager 21 when it comes to the broadcasting starting time of the program so that the recording reservation is performed. And, the local area network manager 21 performs the same processing as a usual recording.

In addition, when the program attention reservation is requested from the terminal device 3, the stream distribution server 2 registers the schedule of the program attention beforehand. The stream distribution server 2 automatically changes the stream branch from the stream multiplexer-demultiplexer 20 based on the registered attention schedule information, and executes the distribution processing of the stream data along the time table of the attention reservation for the terminal device 3. As a result, the channel switch is automatically achieved in the terminal device 3. In any case of a main image and a sub-image, the attention reservation can be set.

Next, a pause request is notified to the stream distribution server 2 when the attention of the program is paused on the terminal device 3 side (YES in step S27). The stream distribution server 2 changes the setting of the stream multiplexer-demultiplexer 20, and stops the distribution processing of the stream data (steps S28 and S29). The flag showing the pause state is set in the destination managing table memory section 37 as mentioned above. In this case, the stream distribution server 2 holds other setting information (program under attending and filtering information, etc.), and maintains the state of the pause until a resume request is notified from the terminal device 3 (step S30).

Hereafter, the filtering processing of this embodiment will be explained referring to the concrete example, especially.

First, the terminal device 3 notifies the stream distribution server 2 the attention request of the plurality of programs to be attended (It is expediently assumed programs A, B, and C). The terminal device 3 notifies the attention priority and filtering information. It is assumed the attention priority is set as program B, A, and C. When the band, for which the local area network can be used, is narrow, the stream distribution server 2 simply reduces the number of distribution programs. That is, the stream distribution server 2 distributes only program B to the terminal device 3 for example, and stops the distribution of other programs A and C. In this case, when, for example, programs A and C are stored in the file device 4, and can be distributed if room is provided in the band. Only program B is distributed by the quality of the attention request (Setting according to filtering information), and other programs A and C may be distributed by debasing the quality by filtering processing of the above-mentioned filter of the stream section 26 (reducing amount of data) (for example, the deletion of the voice information and the reduction of the image quality). In this case, the stream filter 26 executes the transfer rate control by which the amount of data is reduced referring to the priority table shown in FIG. 7.

In addition, when the band, for which the local area network can be used, is few, the stream distribution server 2 deteriorates, for example, the image quality (picture quality) of each of programs B, A, and C by the stream filter 26, and controls the amount of the transmission data within the range of the usable band. As a result, the terminal device 3 can tentatively attend all of requesting each of programs B, A, and C even if the picture quality is deteriorated.

Here, the attention priority and the filtering information from the terminal device 3 are notified to the stream filter 26. The local area network manager 21 executes the change in the allocation band of each terminal device. The local area network manager 21 notifies the stream filter 26 a usable band of the local area network when the allocated band is changed. As a result, the stream filter 26 executes the filtering processing of the stream data on each program according to the priority table which is created and stored beforehand.

In addition, as another concrete example, when the attention of the program including the image at the HD level has been reserved from a certain terminal device 3, consider the case that the room of the band of the local area network is small at starting broadcasting of the program. The stream distribution server 2 converts the stream data into the image at the SD level by the filtering processing of the stream filter 26 and distributes to the terminal device 3 when judging that the transmission of the image at HD level is difficult. At this time, the stream distribution server 2 temporarily stores the image at the HD level in the file device 4, and notifies the terminal device 3 a predetermined message. The message includes, for example, "the quality of the program under the distribution is adjusted because of the band limitation of the local area network", and "an original program at the HD level is being recorded simultaneously" etc. Here, when the recording request is regularly received from the terminal device 3, the stream distribution server 2 manages storing the image at the HD level temporarily stored in the file device 4. On the other hand, the image temporarily stored in the file device 4 may be automatically erased when there is no regular recording request even if regulated time passes.

When the terminal device 3 attends a plurality of programs A and B (Here, it is assumed that the attention priority of program A is higher) at the same time, the case where the current attention state cannot be maintained is assumed by the congestion of the local area network. The stream distribution server 2 pauses the distribution of the program B with low attention priority, and reduces the amount of the transmission data. And, when the congestion of the local area network is canceled, the stream distribution server 2 restarts the distribution processing of the program B. Here, when the program B distribution stops, the stream distribution server 2 may temporarily store the image at the SD level included in the program into the file device 4. In this case, the image, which was not able to be attended, can be attended later though it becomes a partial recording program B.

(Function of Stream Multiplexer-Demultiplexer 20)

Here, the function of the stream multiplexer-demultiplexer 20 which is a main element of the stream distribution server 2 is as mentioned above. That is, there are a registration of the output destination of the stream data (output destination managing table 37A), a registration of the packet identifier of stream data of each every output destination (packet identifier managing table 37B), and a setting of the information sending at the output destination unit (destination managing table memory section 37) as a setting procedure of the branch condition of the received stream data.

As described above, the stream multiplexer-demultiplexer 20 registers the packet identifier to the output destination unit. Here, at the branch processing, the output destination list is obtained from the packet identifier. Since this processing is generated at the packet unit, a speed-up is requested to improve the throughput. The packet identifier managing table 37B is a table to obtain the output destination from the packet identifier. An information, in which the output destination is not defined, is canceled. The function to set the state flag at the table to set validity/invalidity of the information sending at the output destination unit is provided. When the transmission of the stream data is stopped temporarily or restarted, this function can be used.

(Application Example of the Embodiment)

Hereafter, an operation of the stream distribution server when this embodiment is applied to a concrete example will be explained.

(Broadcasting Attention)

A case where the terminal device A puts out the attention request of a program X is assumed, now. Where, the program X is constructed with the data of the packet identifiers pid1, pid2, and pid3.

The contents information manager 27 in the stream distribution server 2 manages the program information, and has information to specify whether each program is constructed with the data of which packet identifier. The local area network manager 21 in the stream distribution server 2 receives the attention and recording request, etc. from the terminal device A, and performs the setting of the stream multiplexer-demultiplexer 20 and the stream filter 26. The local area network manager 21 monitors the local area network, and performs the band setting of the stream filter 26 if necessary.

An output buffer buf-a for the terminal device A is prepared in the stream multiplexer-demultiplexer 20. In addition, a stream filter flt-a for the terminal device A is prepared therein. It is recorded that the data of packet identifiers pid1, pid2, and pid3 are output to the output buffer buf-a in the output destination managing table 37A. It is recorded that each data of packet identifiers pid1 to pid3 is output to the output buffer buf-a in the packet identifier managing table 37B (inverted table).

The data processing section 30 of the stream multiplexer-demultiplexer 20 acquires the packet identifier of an input data, and determines the data output destination referring to the packet identifier managing table 37B. The stream branch route to the terminal device A is established by such processing.

(Attention of the Same Program by Another Terminal Device)

Here, a case where the terminal device B different from the terminal device A puts out the attention request of the same program X is assumed. The output buffer buf-b for the terminal device B is similarly prepared in the stream multiplexer-demultiplexer 20. The stream filter flt-b for the terminal device B is also prepared. A fact the data of the packet identifiers pid1, pid2, and pid3 is output to the output buffer buf-b is recorded to the output destination managing table 37A. The packet identifier managing table 37B is renewed, and it is recorded that each data of packet identifiers pid1 to pid3 is output to the output buffer buf-a and the output buffer buf-b.

The data processing section 30 in the stream multiplexer-demultiplexer 20 acquires the packet identifier of the input data, and determines the data output destination referring to the packet identifier managing table 37B. Therefore, each data of packet identifiers pid1 to pid3 is delivered to the terminal device A and the terminal device B, respectively. The attention of the same program will be achieved by such processing in a plurality of terminal devices A and B.

(Attention of Another Program by Another Terminal Device)

It is assumed the terminal device C different from the terminal devices A and B puts out the attention request of the program Y different from the program X. Here, the program Y is constructed with the data of the packet identifiers pid4, pid5, pid6, and pid7. The output buffer buf-c for the terminal device C is prepared in the stream multiplexer-demultiplexer 20. The stream filter flt-c for the terminal device C is also prepared therein. A fact that the data of the packet identifiers pid4, pid5, pid6, and pid7 is output to the output buffer buf-c is recorded to the output destination managing table 37A. The packet identifier managing table 37B is renewed, and it is recorded that each data of the packet identifier pid1 to pid3 is output to the output buffer buf-a and the output buffer buf-b. In addition, it is recorded that each data of the packet identifiers pid4, pid5, pid6, and pid7 is output to the output buffer buf-c.

The data processing section 30 in the stream multiplexer-demultiplexer 20 acquires the packet identifier of the input data, and determines the data output destination referring to the packet identifier managing table 37B. Therefore, each data of the packet identifiers pid1 to pid3 is delivered to the terminal device A and the terminal device B, respectively. Each data of the packet identifiers pid4 to pid7 is delivered to the terminal device C. The deliveries of the same program X and the different program Y are achieved by such processing in the plurality of the terminal devices A, B, and C.

(Band Limitation)

Next, a case where the allocated band to the terminal device C is decreased is assumed according to the change of the use state of the local area network. Here, the data corresponding to the packet identifiers pid4, pid5, and pid6 of the program Y, is assumed to be partial data which constructs the image data. When receiving all of each data of packets identifiers pid4, pid5, and pid6, it is assumed a high-quality image can be reproduced on the terminal device C side. The data of the packet identifier pid7 is a voice data. It is assumed that this program Y is data capable of adjusting the quality (adjusting the band) by the Stream Shaping processing.

In addition, the priority between the image data is assumed to be the order of the packet identifiers pid4, pid5, and pid6. The user can specify the priority of the image and the voice. That is, the data priority order of the program Y is settable either of in the order of packet identifier pid4, pid5, pid6, and pid7 or in the order of packet identifier pid7, pid4, pid5, and pid6.

The local area network manager 21 in the stream distribution server 2 acquires the packet priority information referring to the content information manager 27. In addition, the request (priority setting of the image and the voice) from the terminal device C is reflected, and a setting of the priority table of the stream filter flt-c (band setting of each data) of the local area network manager 21 corresponding to the terminal device C is performed. The local area network manager 21 sets the band newly calculated to the stream filter flt-c corresponding to the terminal device C.

The stream filter flt-c performs the Stream Shaping processing according to the set priority table and the set band. That is, the transmission rate of the stream data delivered from the stream filter flt-c to the terminal device C is adjusted. The delivery of the stream data which limits the transmission band (The amount of data is reduced) is achieved by such processing.

(Pause and Resume)

Next, a case where the terminal device B puts out the request of the pause while attending the program is assumed. When the request of the pause is received from the terminal device B, the local area network manager 21 in the stream distribution server 2 performs the setting of the pause of the stream delivery to the stream multiplexer-demultiplexer 20. Here, there is a flag which sets validity/invalidity of the output destination for each output buffer (a to c) in the output destination managing table 37A of the stream multiplexer-demultiplexer 20. The stream multiplexer-demultiplexer 20 turns off an valid flag of the output destination corresponding to the terminal device B when the stream delivery to the terminal device B is paused, and invalidates the output. In this case, the output destination managing table 37A and the packet identifier managing table 37B hold the setting (settings other than the valid flag of the output destination) corresponding to the terminal device B as-is.

On the other hand, when the terminal device B puts out the resume request, the local area network manager 21 turns on a valid flag of the output destination by the output destination managing table 37A. Here, the data processing section 30 in the stream multiplexer-demultiplexer 20 refers to a valid flag of the output destination in the output destination managing table 37A when outputting data. When the valid flag is in off state, the data processing section 30 does not execute the data output.

When the program, to which the terminal device B attends, is the VOD (video on demand), the terminal device B can put out the pause request of the stream delivery to the VOD server. A function to switch the stream delivery to the terminal device to the output to the file device 4 is provided while pausing in any case that the program to which the terminal device B attends is the broadcasting or the VOD. In this case, when the pause is resumed, each of the output from the stream multiplexer-demultiplexer 20 to the file device 4, the input from the file device 4 to the stream multiplexer-demultiplexer 20, and the output of the input data to the stream filter 26 is executed at the same time. That is, the data which flows to the stream multiplexer-demultiplexer 20 while stopping the stream delivery to the terminal device B temporarily is never lost without attending, and the attention, which continues after releasing the pause, becomes possible (time shift attention function). It may be temporarily stored in an internal memory of the stream multiplexer-demultiplexer 20 (not shown) but not the file device 4, if the capacity of an internal memory of the stream multiplexer-demultiplexer 20 is sufficient.

The pause/resume of the stream delivery, and the time shift attention function under the pause are achieved by such processing.

(Attention of Storage Stream)

The content information manager 27 in the stream distribution server 2 also manages information of contents stored in the file device 4 through the file I/O section 25. Here, a case where the terminal device A puts out the acquisition request of content information to the stream distribution server 2 is assumed.

When the request from the terminal device A is accepted, the local area network manager 21 in the stream distribution server 2 acquires content information from the content information manager 27 and transmits it to the terminal device A.

In addition, the terminal device A decides the attention object contents is a file m (This is a stream) referring to the received content information, and puts out the attention request of the file m in addition to the program X of the current attention. When the attention request of the file m is accepted, the local area network manager 21 changes the stream input setting of the stream multiplexer-demultiplexer 20.

The stream multiplexer-demultiplexer 20 puts out the input request of the file m to the file I/O section 25. The file I/O section 25 reads the file m from the file device 4, and outputs this to the stream multiplexer-demultiplexer 20. Here, an inflow stream from the file I/O section 25 and the broadcasting stream BS are multiplexed in data input section 31 in the stream multiplexer-demultiplexer 20. In addition, the output destination managing table 37a and the packet identifier managing table 37b in the stream multiplexer-demultiplexer 20 are set to output the file m to the output buffer buf-a corresponding to the terminal device A.

The data processing section 30 in the stream multiplexer-demultiplexer 20 sends only the program X and the data of the file m to the output buffer buf-a corresponding to the terminal device A. As a result, the multiplex stream of the program X and the file m are transmitted to the terminal device A. Therefore, the program X and the file m can be attended at the same time at the terminal device A. Naturally, the setting, to which only the file m is attended, is possible.

(VOD Attention)

In addition, a concrete example when the embodiment is applied to the use of VOD will be explained.

The stream distribution server 2 is assumed to have acquired information on the VOD server of the wide area (information to be accessed). The terminal device D puts out the attention request of the VOD to the stream distribution server 2 not to the VOD server.

When the attention request of the VOD from the terminal device D is accepted, the local area network manager 21 in the stream distribution server 2 controls the wide area network communication section 23, and connects it with the VOD server of the wide area. As a result, the local area network manager 21 receives the stream data VS transmitted from the VOD server through the wide area network communication section 23. In addition, the local area network manager 21 performs the setting of the stream multiplexer-demultiplexer 20 and the stream filter 26, and establishes the stream delivery route to the terminal device D. That is, the output buffer buf-d for the terminal device D is prepared in the stream multiplexer-demultiplexer 20 as mentioned-above. A stream filter d for the terminal device D is prepared.

The stream delivery from the VOD server of the local area is started by such processing, and the attention of the requesting stream data VS becomes possible at the terminal device D.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A stream distribution system comprising a stream distribution server, a plurality of terminal devices each having an information reproduction function, and a local area network connecting the stream distribution server and the terminal devices, wherein the stream distribution server comprises:

at least two receptors each for receiving stream data transmitted through a broadcasting network and stream data transmitted through a communication network, the stream data comprising information arranged in packets, and a packet identifier being added to each packet;

a selector for selecting a predetermined unit of information from the stream data received by the receptors according to a distribution request received from each of the terminal devices, for mixing the information received from the broadcasting network and the communication network, and for branching the information to a transmitter and a file I/O controller;

the transmitter comprising a filter for adjusting a transmission band of the information to be sent to each of the terminal devices so as to selectively transmit the information received from the selector to each of the terminal devices according to data transmission band availability within the local area network; and the file I/O controller for controlling a file device and for outputting the information received from the selector to the file device; wherein the filter comprises a priority table correlating each of the packet identifiers with a packet priority, the filter refers to the priority table to determine the packet priority of each of the packets, and limits a transmission band of the information to be sent to each of the terminal devices or deletes the information to be sent according to the distribution request, by performing packet filtering based on the packet priority, and when a transmission band allocated to one of the terminal devices requesting the information is limited, the selector outputs the same information to both the transmitter and the file I/O controller, wherein the information received from the selector by the transmitter is band-limited to correspond to the limited transmission band and the band-limited information is transmitted to the terminal device, or, the information received from the selector by the transmitter is deleted by the filter according to the priority table, while at the same time the information received from the selector by the file I/O controller is non band-limited and stored in the file device.

2. The system of claim 1, wherein the file I/O controller outputs the information stored in the file device back to the selector according to a storage data reading request received from one of the terminal devices.

3. The system of claim 1, further comprising a band limitation setter for setting a limitation on the data transmission band allocated to each of the terminal devices according to the use state of the local area network and for constructing the priority table in the filter; wherein the transmitter selectively transmits the information received from the selector to each of the terminal devices according to the limitation set on the data transmission band allocated to each of the terminal devices and by using the filter.

4. The system of claim 3, wherein the band limitation setter controls the file I/O controller and the transmitter, and upon receiving a storage data reading request from one of the terminal devices, causes the transmission of the stream data stored in the file device via the selector and the transmitter to the terminal device.

5. The system of claim 3, wherein the band limitation setter, upon receiving a distribution request from one of the terminal devices, changes a branch setting of the selector, and the selector outputs the stream data received from the receptors to the transmitter.

6. The system of claim 3, wherein the band limitation setter, upon receiving a recording request from one of the terminal devices, changes a branch setting of the selector, and the selector outputs the stream data received from the receptors to the file I/O controller.

7. The system of claim 3, wherein the selector further comprises means for setting a flag to control transmission of the stream data to each of the terminal devices, the means turning off the flag upon receiving a pause request from one of the terminal devices to pause the transmission of the stream data to the terminal device, and turning on the flag upon receiving a resume request from the terminal device to resume the transmission of the stream data to the terminal device.

8. The system of claim 7, wherein the band limitation setter comprises means for controlling the selector and the file I/O controller upon receiving a pause request or a resume request from one of the terminal devices, the means upon receiving a pause request interrupting transmission of the stream data to the terminal device and storing the stream data instead in the file device via the file I/O controller, and the means upon receiving a resume request reading the stream data stored in the file device based on a first-in-first-out processing in parallel with continuously storing the stream data in the file device and transmitting the read-out stream data to the terminal device via the selector and the transmitter.

* * * * *